United States Patent Office 3,567,344
Patented Mar. 2, 1971

3,567,344
ILLUMINATING DEVICE FOR ORIGINAL OF AN ELECTROPHOTOGRAPHIC DUPLICATING MACHINE
Masaya Ogawa, Osaka, and Yorio Yamanoi and Isao Iizaka, Toyokawa-shi, Japan, assignors to Minolta Camera Kabushiki Kaisha, Osaka, Japan
Filed Feb. 12, 1969, Ser. No. 798,675
Claims priority, application Japan, Feb. 15, 1968, 43/11,375
Int. Cl. G03b 15/02
U.S. Cl. 355—8
6 Claims

ABSTRACT OF THE DISCLOSURE

An illuminating device for the original in an electrophotographic duplicating machine, which scans and projects an image of an original, illuminated by a light source on a photo-sensitive paper, which device causes the image to be uniformly bright. The image is formed longitudinally on an exposure slit which is disposed at right angles to the scanning direction.

BACKGROUND OF THE INVENTION

In an electrophotographic duplicating machine which duplicates an original by means of scanning and projecting an image of an original on a photo-sensitive paper, it is necessary that an image to be formed on an exposure slit is bright and that its brightness is uniform over the whole longitude of the exposure slit.

In the actual case, however, the image at the ends of the exposure slit is dim compared with its middle part, because of the optical nature of the illuminating optical system and the image-forming optical system.

In order to avoid this defect, up to now, the brightnes of the tubular light source in a light source room, which illuminates the illuminating station where an original is scanned, has been designed to be greater at the ends than at the middle, or the width of the exposure slit has been designed to be varied sectionally in such a way that its ends are wider than its middle. The former remedy involves much trouble in making such a tubular light source, and the latter course has the defect that establishing the proper relation between the exposure slit, the illuminating station and the image-forming optical system becomes complicated and difficult.

SUMMARY OF THE INVENTION

This invention has for its purpose to eliminate the existing defects above mentioned, and to obtain a bright image which is of uniform brightness throughout. In order to accomplish this aim, a supplementary reflex mirror for illumination is installed near the slit-shaped illuminating station, and a part of the light radiated from the light source room is made to be reflected to the slit-shaped illuminating station by means of this supplementary reflex mirror, and the intensity of radiation of the light source which is reflected to the illuminating station by means of this supplementary reflex mirror is made longitudinally on the slit-shaped illuminating station and consequently the illumination of the illuminating station is compensated for the loss of the intensity of radiation around the circumference of the image because of the nature of the image-forming optical system.

DESCRIPTION OF THE PREFERRED EMBODIMENT

Figure 1:
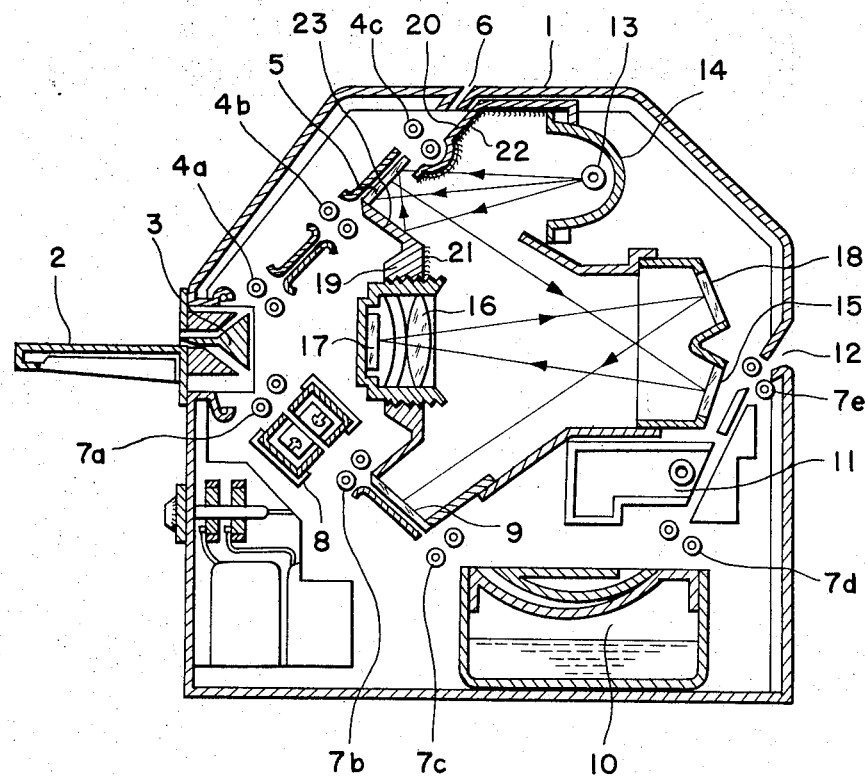
FIG. 1 is a side-section view showing one example of an electrophotographic duplicating machine which embodies this invention.

FIG. 1 is a side-section view of an electrophotographic duplicating machine which embodies this invention. Both the original 25 and a photo-sensitive paper, the former over the latter, are placed on the sending plate 2 which is installed in the front of the case 1 of the electrophotographic duplicating machine, and are separated by the separating plate 3. The original separated from the photo-sensitive paper is sent upwards obliquely by the sending rollers 4a, 4b, and 4c which are driven by a motor not shown in this drawing. During this process, the original is scanned when it passes the illuminating station 5, and is there issued from the outlet opening 6. On the other hand, the photo-sensitive paper passes the charging device 8, being moved by the sending rollers 7a, 7b, 7c, 7d and 7e which are driven by the motor, then the paper is exposed when it passes the exposure slit 9, and passes the developing bath 10 and the drier 11, to be issued from the outlet opening 12.

The light source room comprises the tubular bulb 13 and the tub-shaped reflex mirror 14. The image of the original reflected from the illuminating station 5 illuminated by this light source room is reflected by the reflex mirror 15, and enters into the mirror-lens system composed of the lens 16 and the reflex mirror 17, and radiates from this system and is again reflected by the reflex mirror 18 and consequently forms an image on the photo-sensitive paper passing the exposure slit 9. The shading plate 20 is to shield the part, which should not be illuminated, from the light from the light source, and its inner surface facing the light source is feathered in order to prevent reflection of the light from the light source.

On the part 23, which is connected to the illuminating station 5 at the framework 19 supporting the mirror-lens 16 and 17 and which is facing the light source 13, the supplementary reflex mirror for illumination 23 is installed and another part 21 which might cause undesirable reflection is also feathered as the shading plate 20.

Figure 2:
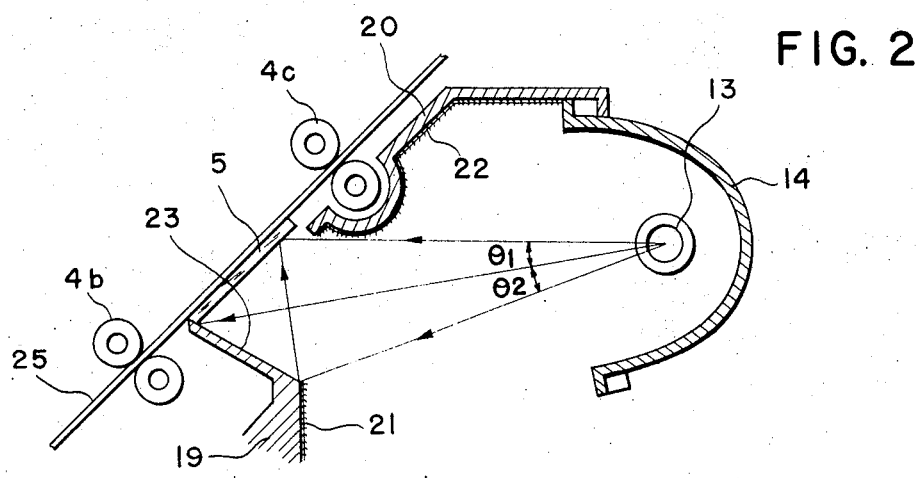
FIG. 2 is a fragmentary, enlarged side-section view of the light source room, the illuminating station and the supplementary reflex mirror for illumination of the same preferred embodiment as FIG. 1.

As shown in FIG. 2, the illuminating station 5 is not only illuminated directly by the beam at an angle $\theta1$ of the light from the tubular bulb 13 of the light source and the light reflected by the reflex mirror 14, but also is illuminated by the beam at an angle $\theta2$ of the light reflected by the supplementary reflex mirror for illumination 23 as above mentioned. By this device, even when the reflective rate of the supplementary reflex mirror for illumination is low, the illumination can be increased by 30%–50%.

Figure 3:
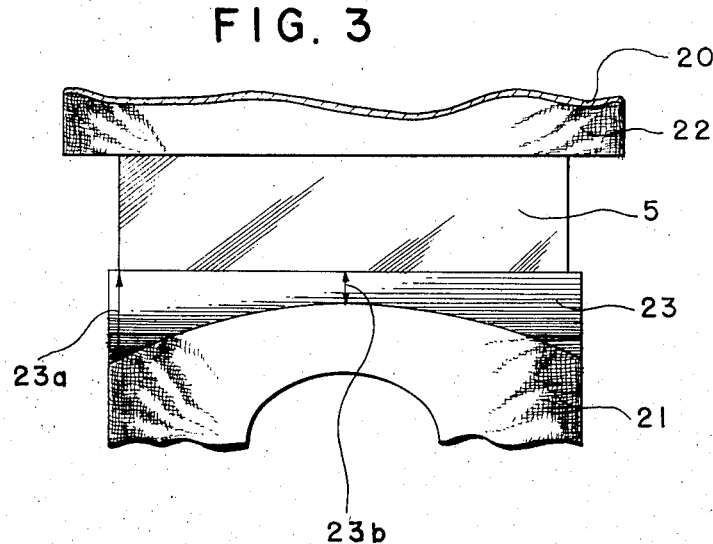
FIG. 3 is a front view corresponding to FIG. 2.

If it is intended to make the beam of the increased illumination at both sides larger than that at the middle of the illuminating station 5, as shown in FIG. 3, it is enough to make the width of the supplementary reflex mirror for illumination varied longitudinally in such way that both sides 23a are wider than its middle part 23b. Another way which can be taken is to make the width uniform longitudinally, making the reflective rate of both sides higher than that of the middle part. If a tubular bulb is intended to be used which is brighter at its ends than around its middle part, it is enough to vary the width taking into consideration of this variation of brightness. In short, the width of the supplementary reflex mirror for illumination can be thus so regulated in any case that the scanned image is formed with uniform brightness longitudinally on the exposure slit.

Thus by this invention, a bright scanned image with uniform brightness can be formed on a photo-sensitive paper passing the exposure slit 9. Therefore the duplicating speed can be increased and a duplicate can be made to be more faithful to an original, and consequently this enables making the electrophotographic duplicating machine smaller.

Though, in the above mentioned preferred embodiment, an original is set to be moved at the illuminating station, this invention can be also adapted to the case in which an original is held stationary, while the illuminating station, the light source room and the supplementary reflex mirror for illumination are moved together as one body, to do the scanning.

What is claimed is:

1. In an illuminating device for the original in an electrophotographic duplicating machine of the type which scans an original and duplicates the same on a photo-sensitive paper, such scanning including the relative movement of said original past said illuminating device in one direction, the combination comprising a light source, an illuminating station facing said light source, a reflex mirror for supplementary illumination facing said light source and positioned to reflect light from said source to said station, and means for varying the intensity of the light reflected by said mirror for supplementary illumination, such variation occurring in a direction at right angles to said one direction.

2. The combination defined in claim 1, said means consisting in a variation of the width of said mirror for supplementay illumination in the direction of said intensity variation.

3. The combination defined in claim 1, said means consisting in a variation in the reflectivity of said mirror for supplementary illumination in the direction of said intensity variation.

4. The combination defined in claim 1, said light source being tubular in form and varying in intensity of radiation along its length.

5. The combination defined in claim 1, said illuminating device being stationary and said relative movement being caused by movement of said original.

6. The combination defined in claim 1, said original being stationary and said relative movement being caused by movement of said illuminating device.

References Cited

UNITED STATES PATENTS

| 3,364,816 | 5/1970 | Jeffree | 355—51 |
|---|---|---|---|
| 2,959,095 | 11/1960 | Magnusson | 355—49 |
| 3,469,916 | 9/1969 | Sloan | 355—67 |

SAMUEL S. MATTHEWS, Primary Examiner

D. J. CLEMENT, Assistant Examiner

U.S. Cl. X.R.

355—11, 27, 51, 66